United States Patent Office 2,911,261
Patented Nov. 3, 1959

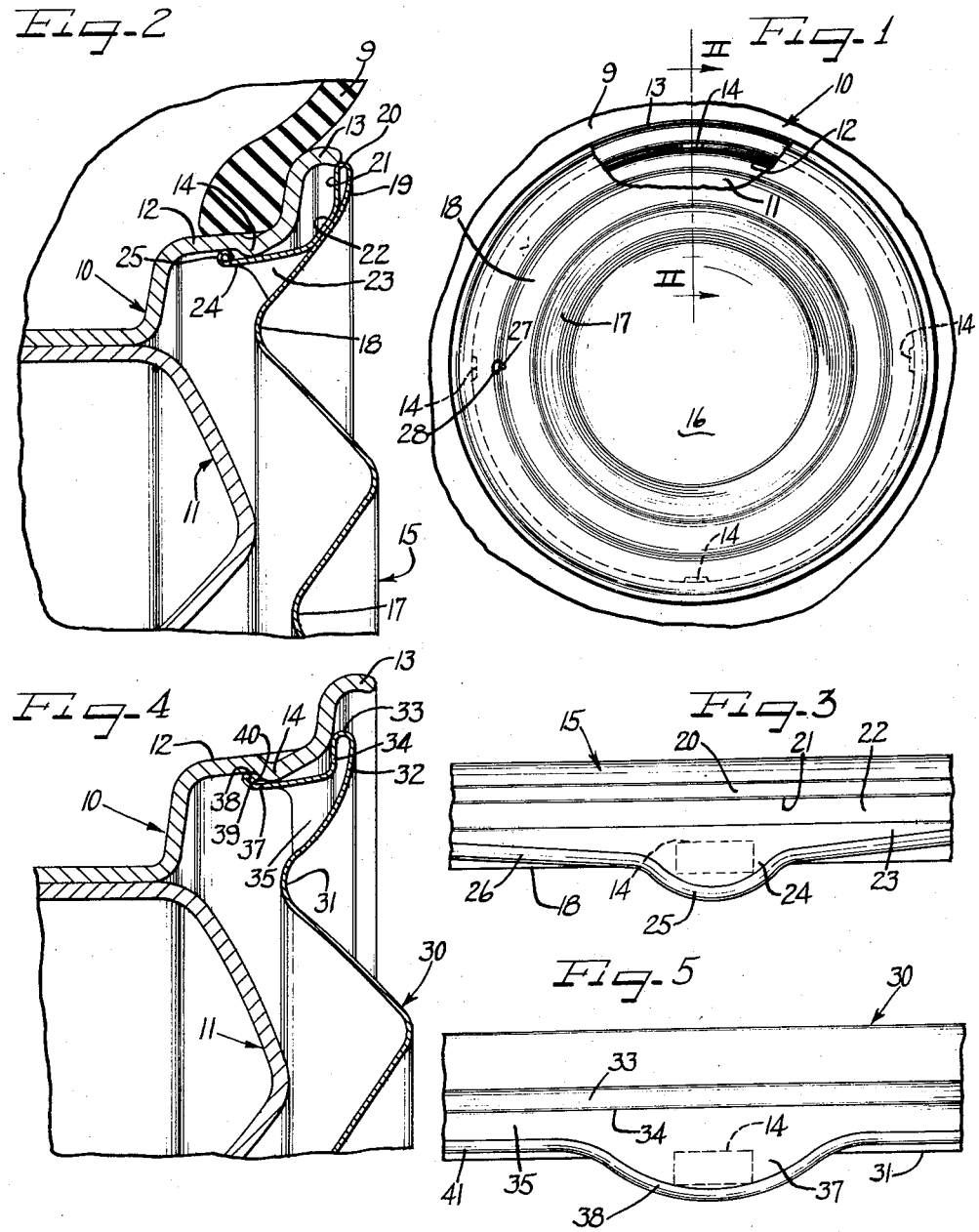

2,911,261

WHEEL COVER

George Albert Lyon, Detroit, Mich.

Application February 10, 1958, Serial No. 714,241

9 Claims. (Cl. 301—37)

The present application is a continuation-in-part of my applications Serial No. 516,537 filed June 20, 1955 and Serial No. 531,377 filed August 30, 1955, now abandoned.

This invention relates generally to wheel structures and more particularly to a new and improved retaining structure for maintaining a wheel cover on a tire rim.

Another object of this invention is to provide a simplified cover-retaining finger construction which may efficiently cooperate with a wheel to retain the cover thereon.

Another object of the invention is to provide a wheel cover having improved cover retaining finger means especially suitable for press-on, pry-off engagement with retaining bumps on an annular radially inwardly facing flange of a tire rim.

A further object of the invention is to provide a wheel cover with self-retaining fingers providing means for not only retaining engagement with retaining bumps on a tire rim, but also with means to hold the cover against turning on the wheel.

Still another object of the invention is to provide a self-retaining wheel cover for disposition over the outer side of a vehicle wheel and which cover is adapted for economical manufacture on a mass production scale.

Other objects, features and advantages of the present invention will be readily apparent from the following detailed description of certain preferred embodiments thereof taken in conjunction with the accompanying drawing, in which:

Figure 1 is an outer side elevational view of a wheel structure, with certain portions broken away for clarity of illustration, embodying the present invention;

Figure 2 is an enlarged fragmentary radial sectional detail view taken substantially on the line II—II of Figure 1;

Figure 3 is an edge elevational view of a portion of the cover of Figures 1 and 2 showing one of the retaining fingers in plan;

Figure 4 is a fragmentary radial sectional detail view similar to Figure 2 but showing a modified form of the present invention; and Figure 5 is a fragmentary edge view of the cover of Figure 4 showing one of the retaining fingers in plan.

The novel wheel cover of the present invention is cooperable retainingly with a more or less conventional type of automobile wheel adapted to support a tubeless tire 9. For this purpose, the wheel is provided with a multi-flange, drop-center type of tire rim 10 supported by a centrally dished, disk spider metal wheel body 11 provided with the usual central bolt-on flange means (not shown) by which the wheel can be attached by bolts or cap screws (not shown) to a part on an axle of a vehicle.

The tire rim 10 includes an intermediate flange 12 which faces annularly radially inwardly and merges with a generally radially outwardly and then axially outwardly extending terminal flange 13. On the intermediate flange 12, and more particularly in the axially outer portion thereof, and pressed radially inwardly is a plurality of circumferentially spaced retaining bump extensions or protuberances 14 adapted to retain over the outer side of the wheel an ornamental and protective cover 15. This cover is adapted to be made from thin sheet metal such as stainless steel or other thin sheet steel, brass, aluminum alloy, and the like adapted to be stamped and drawn into shape.

Centrally the cover has a crown portion 16 leading into an annular generally dished portion 17 having radially outwardly thereabout an annular dished portion 18 of a diameter to overlie the juncture between the wheel body and the tire rim. At its radially outer margin the cover has a turned generally radially outwardly extending annular marginal portion 19 of a diameter to overlie the terminal flange 13 and in this instance provided with a turned finishing and reinforcing edge 20 adapted to lie in assembly on the tip of the terminal flange.

Extending generally radially inwardly from the edge 20 is an annular underturned flange 21 having a portion thereof at 22 for backed up engagement against the inner side of the cover member and more particularly the radially inner portion of the marginal portion 19 of the cover. From the radially inner side of the back-up portion 22 of the flange extends generally axially inwardly a continuous annular flange extension portion 23 of a diameter to generally telescopically fit in slightly spaced relation inside the axially outer portion of the intermediate flange 12.

At suitable spaced intervals matching the intervals at which the retaining bumps 14 are disposed and adapted to align retainingly with the retaining bumps 14, of which there may be four equidistantly spaced as shown in Figure 1, is a series of generally axially inwardly extending cover retaining fingers 24. Each of the fingers 24 is constructed and arranged to define a pocket opening generally radially outwardly in which one of the respective protuberances 14 is adapted to be socketed or nested and resiliently gripped by the finger extension. To this end, each of the fingers 24 is formed integrally in one piece with the flange 23 as a generally axially inward extension of a length to extend opposite and axially inwardly beyond the associated retaining bump 14 (Figs. 2 and 3) when the cover is fully home on the wheel, and of a width somewhat greater than the width of the retaining bump 14. Such relationship is evident from the dotted or phantom showing of the retaining bump 14 in Figure 3.

For retaining engagement of the fingers 24 with the retaining bumps 14 and for substantially reinforcing and stiffening the retaining fingers, a generally radially outwardly projecting fairly stiff retaining terminal 25 is provided in the form of a turned flange which may be in the form of a bead. On at least one, and preferably all of the fingers 24 the flange bead 25 extends continuously on the terminal and side portions of the respective retaining fingers and in the present instance comprises part of a continuous terminal edge reinforcing bead flange 26 on the axially extending flange portion 23. It will be observed in Figure 3 that the finger flange portion 25 is of arcuate configuration in an axial direction. It is also of arcuate configuration in a circumferential direction following the arcuate curvature of the finger 24 and the flange 23.

Within the finger edge terminal and side flange 25 is defined a socket or pocket within which the associated retaining bump protuberance 14 is nestably socketed for engagement by the turned flange 25 to retain the cover on the wheel. It will be observed that the finger flange 25 provides protuberance-opposing surface portions that are radially outwardly offset from the body of the finger 24 and face toward the axially inner and circumferential side surfaces of the protuberance for not only retaining the cover in its axially inward disposition on the wheel, but also assuring corotation of the cover on the wheel.

In assembling the cover 15 over the outer side of the wheel, a valve stem 27 is registered through an aligned valve stem aperture 28 in the dished portion 18 and thus aligning the respective retaining fingers 24 with the cover retaining bump protrusions 14. Then the cover is pressed axially inwardly which causes the retaining finger pocket flanges 25 to cam radially inwardly from a slightly larger diameter than the diameter described about at least the axially inner shoulder portions of the retaining bumps until the finger flanges 25 snap in behind the retaining bumps and by coaction of the retaining flanges 25 of the fingers with the retaining bumps draw the cover axially inwardly so that the tip 20 bears on the tip of the terminal flange 13 and thus holds the retaining fingers under engaging tension with the retaining bumps.

Removal of the cover 15 may be effected by inserting a pry-off tool such as a screwdriver (not shown) between the edge 20 of the cover and the terminal flange 13 and exerting pry-off leverage to snap the adjacent retaining finger 24 free from its associated retaining bump 14.

It will be observed in Figure 2 that there is ample chamber space afforded behind the flange portion 21, 22 of the cover with the terminal flange 13 to accommodate wheel balancing weights.

In the modification of Figures 4 and 5, a cover 30 is provided which is adapted to be applied in press-on, pry-off relation similarly as the cover 15 to the outer side of the same wheel, so that in Figure 4 the portions of the wheel are identified by identical reference numerals. Similarly as in the cover 15, the cover 30 has a central portion that is constructed and arranged to overlie the wheel body 11 and an intermediate generally axially inwardly dished portion 31 has a radially outer annular marginal portion 32 provided with a turned reinforcing and finishing edge 33. In this instance, however, the edge 33 is of a smaller diameter than the edge 20 of the cover 15 so that the edge 33 will overlie the radially inner portion of the terminal flange 13, with a generally radially inwardly extending underturned flange 34 lying opposite the intermediate flange 12. From the underturned flange 34 extends generally axially inwardly a continuous annular flange portion 35 of a diameter to telescope in spaced relation within the axially outer portion of the intermediate flange 12 and provided with a suitable series of axially inward integral retaining finger extensions 37 for retaining engagement with the retaining bumps 14 in press-on, pry-off relation.

The retaining fingers 37 are of resilient construction provided with a continuous rolled over retaining and reinforcing flange 38 joined to the body of the finger by a generally radially outwardly and axially inward terminal flange portion 39. At its terminal edge 40 the turned over flange 38 engages against the adjacent body of the retaining finger extension 37 or at least opposes the adjacent body portion of the finger. Through this arrangement, the turned finger flange portion 38 opposes throughout its width the opposing surfaces of the retaining bump or protuberance 14.

It will be observed that the retaining finger is of a width substantially greater than the associated retaining bump 14 in order to accommodate the turned reinforcing and retaining flange structure 38, 39, but by virtue of the axially inward arcuate and circumferentially arcuate form of the flange 38, it provides a suitable pocket with the retaining finger 37 within which the retaining bump 14 is accommodated and engaged by the retaining flange 38 both for axially inward disposition of the cover and to hold for corotation with the wheel. It will also be observed that the flanges 38, 39 are part of a continuous reinforcing flange structure 41 on the edge of the axially extending flange portion 35 between the retaining fingers 37.

Application and removal of the cover 30 is effected substantialy the same as described in connection with the cover 15.

With respect to both of the covers 15 and 30, the edge flange structure of the finger carrying flange affords resilient stiffness that is highly desirable in retaining the cover on the wheel through the medium of the integral retaining finger extensions. If preferred, of course, the terminal edge flange structure could be provided only on the retaining fingers, inclusive of the axially inner ends and sides thereof, but the continuous turned reinforcing edge flange structure affords advantages in stiffening the retaining flange structure resiliently. Furthermore, the turned flange structure by opposing the adjacent tire rim flange provides a cushioning buffer or bumper contact means resisting radial displacement of the cover during road shocks and the like tending to displace the cover radially.

If preferred, less than all of the retaining fingers on the cover may be provided with the retaining terminal and side flange structure.

While the cover 15 is shown as bottoming at its outer edge against the tip of the terminal flange 13, and the cover 40 as bottoming at its edge against the radially inner portion of the terminal flange, it will be appreciated that either cover may be constructed in either fashion, or that the retaining finger structure of one cover may be substituted for the other, as preferred. In each instance, the marginal flange structure of the cover affords convenient reinforced means for engagement therebehind of a pry-off tool in prying the cover free from the wheel. At the same time, the reinforced marginal structure of the cover facilitates application of the cover to the wheel and more particularly into snap-on relation with the retaining bumps without undue distortion.

It will be understood that modifications and variations may be effected without departing from the scope of the novel concepts of the present invention.

I claim as my invention:

1. In a wheel structure including a multi-flanged tire rim with an annular flange provided with a radially inwardly projecting extension, a circular wheel cover member having an underturned continuous annular flange extending axially inwardly inside of the rim flange and terminating at intervals in circumferentially spaced fingers, said fingers each having a pocket defined by a generally axially inwardly extending arcuate portion with the outer margin of said arcuate portion provided with a turned gripping edge, said arcuate portion and edge defining together a pocket in which the extension is nested retainingly behind said edge and bottomed against said arcuate portion in order to insure corotation of the cover on the wheel.

2. In a wheel structure including a multi-flanged tire rim with an annular flange provided with a radially inwardly projecting extension, a circular wheel cover member having an underturned continuous annular flange extending axially inwardly inside of the rim flange and terminating at intervals in circumferentially spaced fingers, said fingers each having a pocket defined by a generally axially inwardly extending arcuate portion with the outer margin of said arcuate portion provided with a turned gripping edge, said arcuate portion and edge defining together a pocket in which the extension may retainingly nest in order to insure corotation of the cover on the wheel, said turned edges extending continuously along the periphery of said arcuate portions to insure close cooperation between the finger and the extension on the annular wall.

3. In a wheel structure including a multi-flanged tire rim with an annular flange provided with a radially inwardly projecting extension, a circular wheel cover member having an underturned continuous annular flange extending axially inwardly inside of the rim flange and terminating at intervals in circumferentially spaced fingers, said fingers each having a pocket defined by a generally axially inwardly extending arcuate portion with the outer margin of said arcuate portion provided with a turned gripping edge, said arcuate portion and edge defining together a pocket in which the extension may retainingly nest in order to insure corotation of the cover on the wheel, said turned edges extending continuously along the periphery of said arcuate portions, each of said edges being wrapped around a substantial portion of the extension to insure close cooperation therewith.

4. In a wheel structure including a multi-flanged tire rim with an annular flange provided with a radially inwardly projecting extension, a circular wheel cover member having an underturned continuous annular flange extending axially inwardly inside of the rim flange and terminating at intervals in circumferentially spaced fingers, said fingers each having a pocket defined by a generally axially inwardly extending arcuate portion with the outer margin of said arcuate portion provided with a turned gripping edge, said arcuate portion and edge defining together a pocket in which the extension may retainingly nest in order to insure corotation of the cover on the wheel, said turned edges extending continuously along the periphery of said arcuate portions and said annular flange to insure close cooperation between the finger and the extension on the annular wall while at the same time increasing the resiliency of the fingers, each of said edges being wrapped around a substantial portion of the extension to insure close cooperation therewith.

5. In a wheel structure including a wheel having a multi-flanged tire rim with an annular flange provided with circumferentially spaced radially inwardly projecting protuberances, a circular wheel cover member having an underturned continuous annular flange including a radial back-up portion bottomed against the inner side of the cover member and an axial portion extending axially inwardly inside of said rim flange, said flange having at circumferentially spaced intervals generally axially inwardly projecting extensions providing cover retaining fingers with turned terminal and side flanges thereof respectively defining the peripheries of the finger extensions and providing with the finger extensions respective pockets opening generally radially outwardly in which said protuberances are respectively socketed and resiliently gripped by the finger extensions when the cover member is on the wheel, and with the side portions of said turned finger flanges coactive with the protuberances to hold the cover member against turning on the wheel.

6. In a wheel structure including a multi-flanged tire rim with an annular flange provided with a circumferentially spaced series of generally radially inwardly projecting cover retaining protuberances, a circular wheel cover member having a continuous outer marginal underturned annular flange having exending therefrom at circumferentially spaced points corresponding to said protuberances respective generally axially inwardly extending retaining fingers with body portions having retaining structure thereon engageable in resilient gripping relation with said protuberances to retain the cover on the wheel, at least one of said fingers having said retaining structure in the form of a turned marginal flange on not only its axially innermost portion but also on its circumferential sides and providing protuberance-opposing surface portions offset radially outwardly from the body portion of the finger and facing toward the axially inner and circumferential side surfaces of the protuberance and together with the finger body portion providing a pocket in which the protuberance is generally nested retainingly and to assure corotation of the cover on the wheel.

7. A wheel structure as defined in claim 6 wherein said turned finger marginal flange has the edge thereof spaced from the body of the finger and providing the protuberance-opposing surface portions.

8. A wheel structure as defined in claim 6 wherein said finger marginal flange is turned back toward the body portion of the finger and the surface opposing the protuberance is located between the edge of the flange and juncture of the flange with the finger.

9. In a wheel structure including a wheel body and a tire rim having a flange provided with retaining projections thereon, a cover for disposition at the outer side of the wheel including a marginal flange having retaining finger extensions and a continuous reinforcing resiliency imparting turned terminal structure on said flange and finger extensions and affording substantial resilient stiffness for the retaining finger extensions in engagement with the retaining projections for holding the cover on the wheel, said turned terminal being in the form of a bead turned generally radially outwardly and affording portions thereof at the ends of the retaining finger extensions engageable behind the retaining projections in snap-on, pry-off relation, said turned bead terminal providing at the sides of the finger extensions generally circumferentially facing surface portions opposing the sides of the retaining projections for holding the cover against turning.

References Cited in the file of this patent

UNITED STATES PATENTS

| | | |
|---|---|---|
| 2,624,640 | Lyon | Jan. 6, 1953 |
| 2,665,948 | Lyon | Jan. 12, 1954 |
| 2,671,695 | Lyon | Mar. 9, 1954 |